(12) United States Patent
Nagase et al.

(10) Patent No.: US 9,652,697 B2
(45) Date of Patent: May 16, 2017

(54) CARD HOLDING MEMBER AND CARD CONNECTOR

(71) Applicant: Molex, LLC, Lisle, IL (US)

(72) Inventors: Teruki Nagase, Yamato (JP); Akihiro Shimotsu, Ebina (JP)

(73) Assignee: Molex, LLC, Lisle, IL (US)

(*) Notice: Subject to any disclaimer, the term of this patent is extended or adjusted under 35 U.S.C. 154(b) by 0 days.

(21) Appl. No.: 14/950,060

(22) Filed: Nov. 24, 2015

(65) Prior Publication Data
US 2016/0164205 A1 Jun. 9, 2016

(30) Foreign Application Priority Data

Dec. 3, 2014 (JP) ................................. 2014-244749

(51) Int. Cl.
*H01R 24/00* (2011.01)
*G06K 13/08* (2006.01)
(52) U.S. Cl.
CPC .................................. *G06K 13/08* (2013.01)
(58) Field of Classification Search
CPC ..... H01R 27/00; H01R 13/635; H01R 13/633
USPC .......................................... 439/630, 159, 160
See application file for complete search history.

(56) References Cited

U.S. PATENT DOCUMENTS

| 6,602,096 | B1 | 8/2003 | Kronestedt et al. |
| 7,351,081 | B1* | 4/2008 | Lai ....................... H01R 13/533 439/159 |

FOREIGN PATENT DOCUMENTS

CN 202178465 U 3/2012

* cited by examiner

*Primary Examiner* — Phuongchi T Nguyen
(74) *Attorney, Agent, or Firm* — James A. O'Malley

(57) ABSTRACT

The card holding member is able to hold a card having terminal members and is able to be inserted into a card connector, and includes a frame portion opposing the side surfaces of the card. The frame portion includes a first metal portion composed of a metal plate, a second metal portion composed of a metal plate being a separate component from the first metal portion, and a resin portion surrounding and covering at least a portion of the first metal portion and the second metal portion.

18 Claims, 9 Drawing Sheets

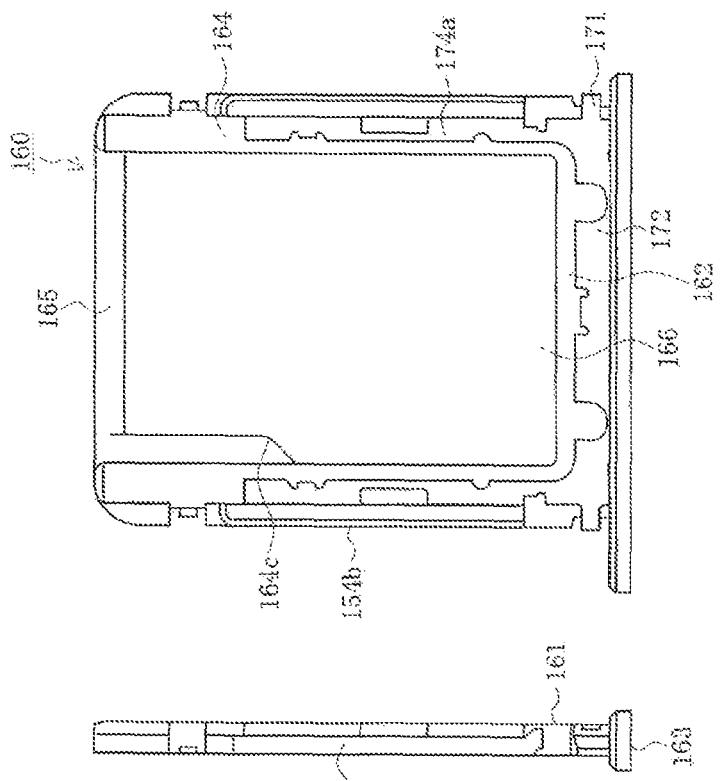
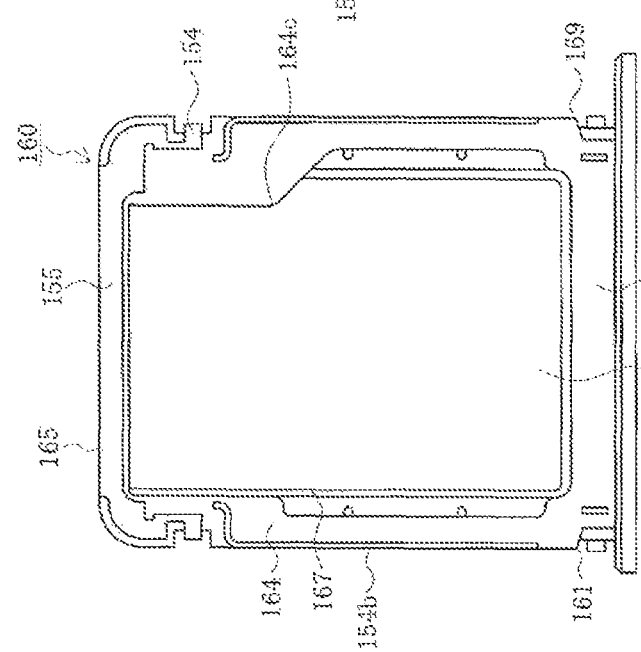
FIG. 3a  FIG. 3b  FIG. 3c  FIG. 3d  FIG. 3e

CARD HOLDING MEMBER AND CARD CONNECTOR

RELATED APPLICATIONS

This application claims priority to Japanese Application No. 2014-244749, filed Dec. 3, 2014, which is incorporated herein by reference in its entirety.

TECHNICAL FIELD

The present disclosure relates to a card holding member and to a card connector.

BACKGROUND ART

Electronic devices such as mobile phones include a card connector enabling the use of various types of cards such as SIM (Subscriber Identity Module) cards.

Electronic devices have become significantly smaller in recent years, and so have cards and card connectors. As a result, it can be difficult for users to grasp a card with the fingers and insert the card properly into a card connector. Therefore, card connectors have been proposed in which a card is set inside a card holder and the card holder is inserted into the card connector (see, for example, Patent Document 1).

FIG. 9 is a perspective view of a card tray and a card connector of the prior art.

In this drawing, 961 is the frame member of a card tray made of a resin material, and 966 is space for accommodating a card 901. The card tray is inserted into the housing 811 of a card connector with a card 901 accommodated inside the space 966. The housing 811 includes a plurality of terminals 851 for establishing an electrical connection with a plurality of electrode pads on the lower surface of the card 901, and a detection switch terminal 818 for detecting the presence of an inserted card tray via contact with a detection switch terminal 817 on the card tray.

When the card tray is inserted into the housing 811, a pair of side frame portions 964, partially constituting the frame member 961, slide along and are guided by a pair of side wall portions 811e in the housing 811. A protruding portion of a latch member 975 on the card tray engages a recessed portion 875 formed on one of the side wall portions 811e, and the card tray is locked in the housing 811.

[Patent Document 1] Laid-Open Patent Publication No. 2003-502738

SUMMARY OF THE INVENTION

The card tray of the prior art is integrally molded using a resin material. Therefore, when the card tray is repeatedly inserted into and ejected from the card connector, the side frame portions 964 and the latch member 975 experience wear. As card trays become smaller and thinner to accommodate smaller cards 901, they also become less strong and more likely to be damaged. A technique has therefore been proposed in which a card tray is obtained by sintering a metal powder compact obtained using metal injection molding (MIM). However, this manufacturing technique is expensive and less dimensionally precise.

Also, some of the very small cards currently in use have electrode pads which cover an entire surface of the card and the edges of these electrode pads are exposed on the edges of the card main body. Some of these exposed electrode pads may come into contact with metal on the card tray and cause a short circuit.

It is an object of the present disclosure to solve this problem by providing a highly reliable card holding member and card connector in which short-circuiting does not occur, which are strong, and which are not subject to damage or wear.

The present disclosure is a card holding member able to hold a card having terminal members and is able to be inserted into a card connector, the card holding member comprising a frame portion opposing the side surfaces of the card, and the frame portion including a first metal portion composed of a metal plate, a second metal portion composed of a metal plate being a separate component from the first metal portion, and a resin portion surrounding and covering at least a portion of the first metal portion and the second metal portion.

In another aspect of the card holding member of the present disclosure, the first metal portion is a frame portion including a cutaway portion, and the second metal portion forms a closed rectangular portion including a portion corresponding to at least the cutaway portion, the cutaway portion being blocked by the second metal portion in plan view.

In another aspect of the card holding member of the present disclosure, the frame portion includes a card accommodating space for accommodating the card, and the first metal portion and the second metal portion are not exposed on the inner surface of the card accommodating space.

In another aspect of the card holding member of the present disclosure, the first metal portion is a metal plate having a thickness greater than that of the second metal portion.

In another aspect of the card holding member of the present disclosure, the frame portion includes a front frame portion positioned in front in the card holding member insertion direction into the card connector, and side frame portions connected to both ends of the front frame portion, a portion of the first metal portion being exposed on the front surface of the front frame portion and the outer surfaces of the side frame portions.

The present disclosure is also a card connector able to receive an inserted card holding member described above, the card connector including an ejection mechanism for ejecting the card holding member.

The present disclosure is able to provide a highly reliable card holding member in which short-circuiting does not occur, which is strong, and which is not subject to damage or wear.

BRIEF DESCRIPTION OF THE DRAWINGS

FIG. 3(a) is a front view of the card tray according to an embodiment of the present disclosure.

FIG. 3(b) is a top view of the card tray of FIG. 3(a).

FIG. 3(c) is a rear view of the card tray of FIG. 3(a).

FIG. 3(d) is a side view of the card tray of FIG. 3(a).

FIG. 3(e) is a bottom view of the card tray of FIG. 3(a).

DETAILED DESCRIPTION OF THE PREFERRED EMBODIMENTS

The following is a detailed explanation of an embodiment of the present disclosure with reference to the drawings.

Figures 1A, 1B:
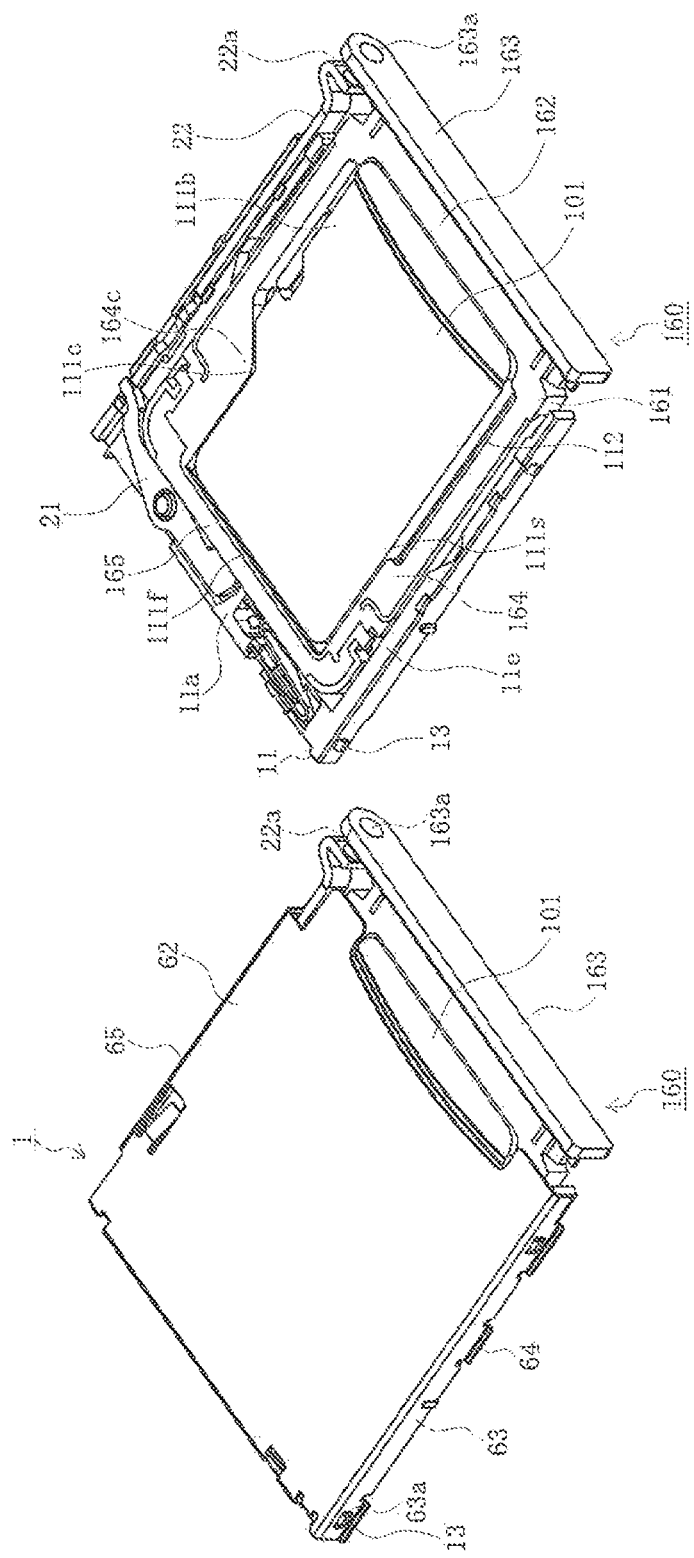
FIG. 1(a) is a perspective view of a card tray inserted into a card connector according to an embodiment of the present disclosure in which the shell attached.
FIG. 1(b) is a perspective view of the card tray of FIG. 1(a) with the shell removed.
Figure 2:
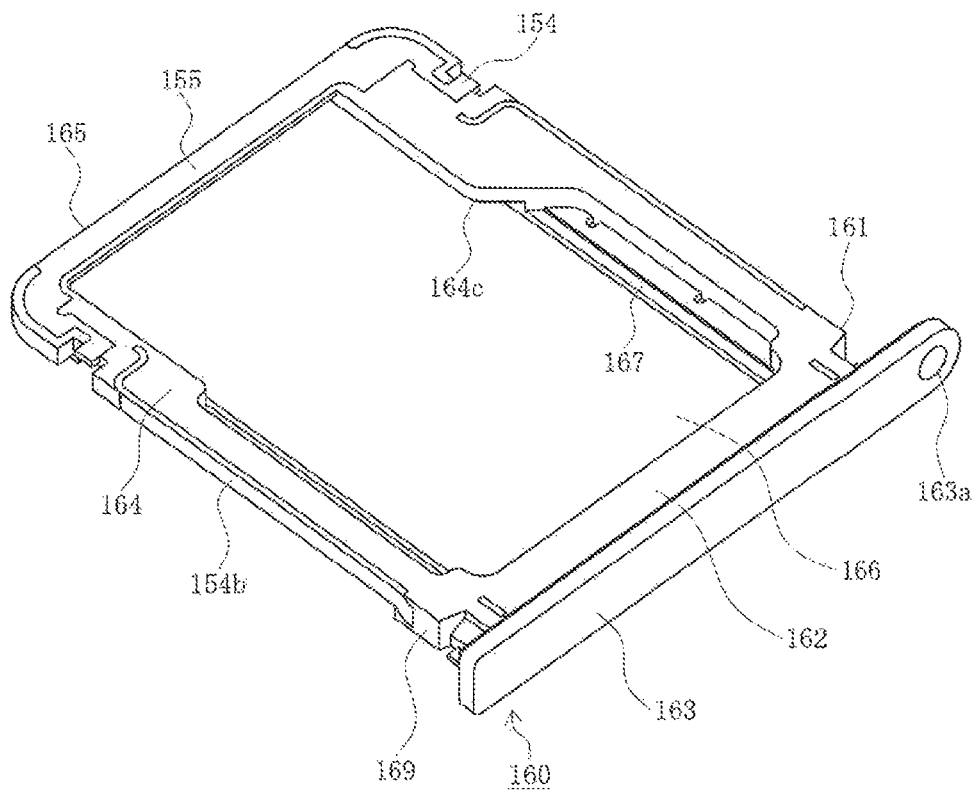
FIG. 2 is a perspective view of the card tray according to an embodiment of the present disclosure.
Figure 4:
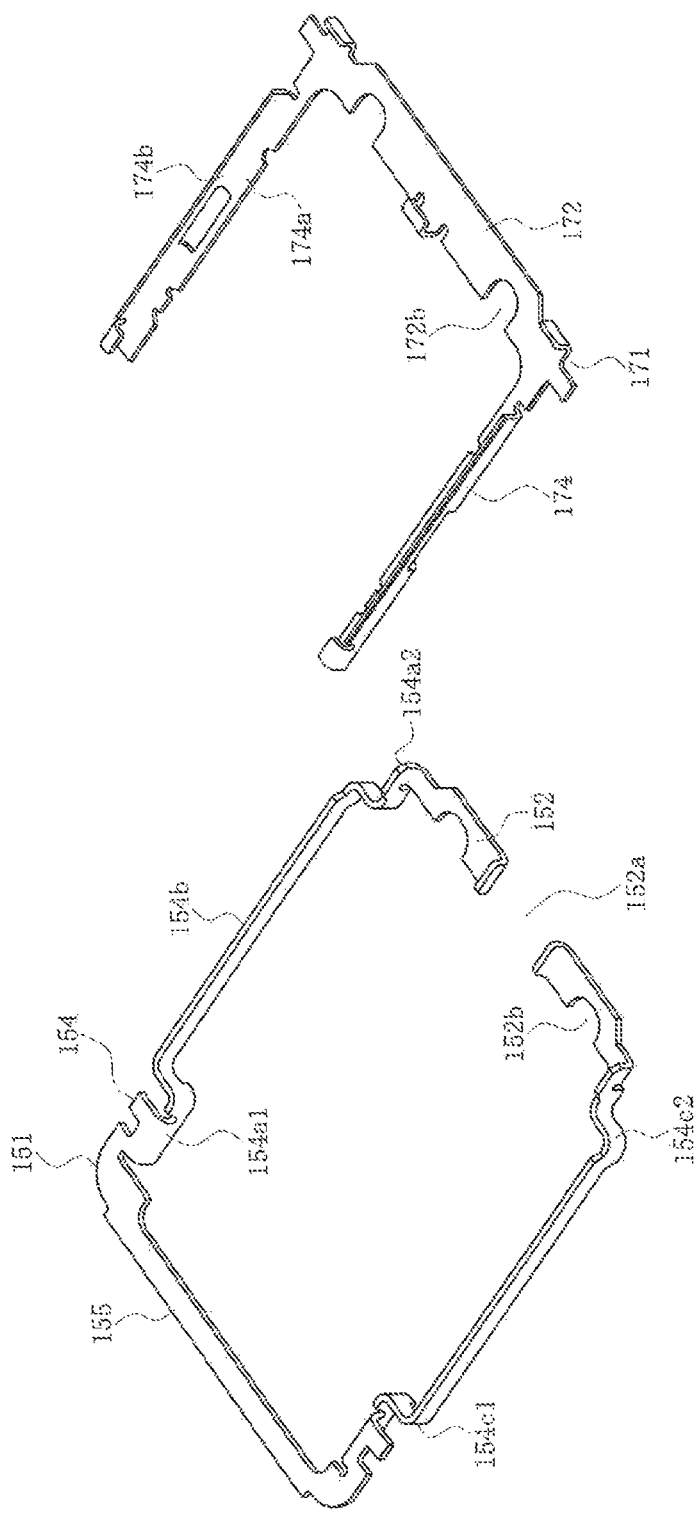
FIG. 4 is a perspective view showing the first member and the second member of the metal portion of the card tray according to an embodiment of the present disclosure.
Figure 5:
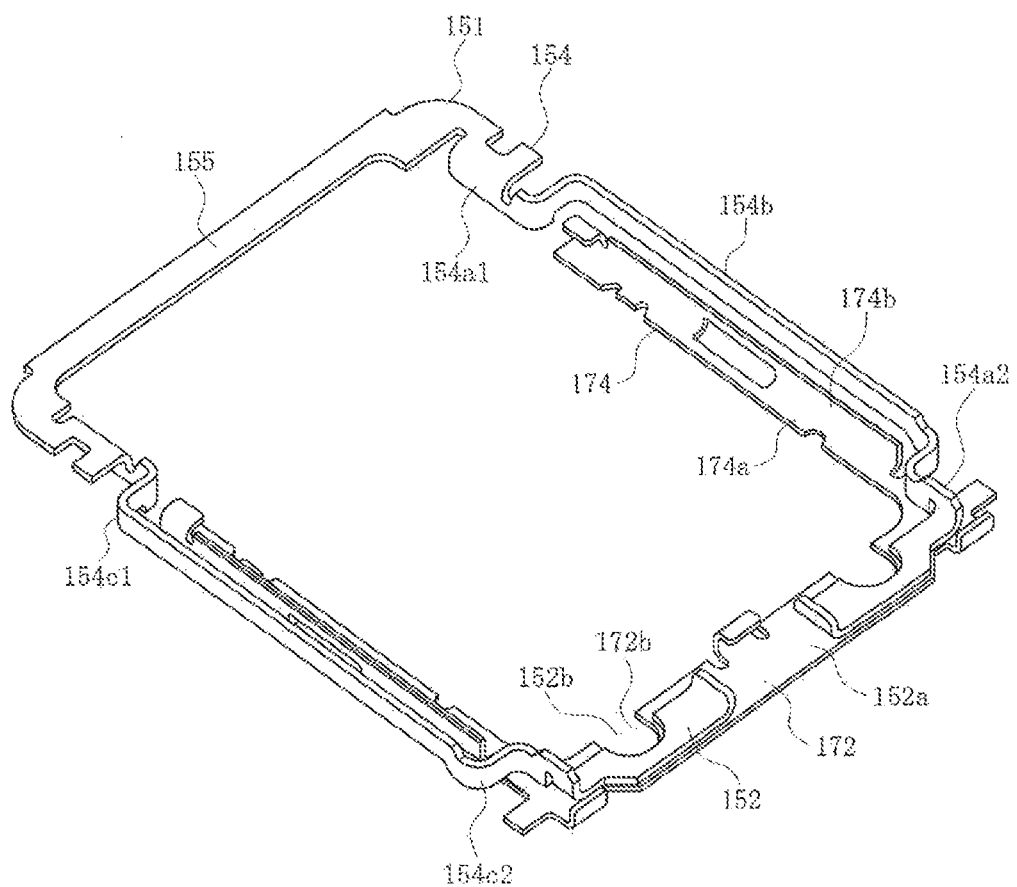
FIG. 5 is a perspective view showing the combined first member and second member of the metal portion of the card tray according to an embodiment of the present disclosure.
Figure 6:
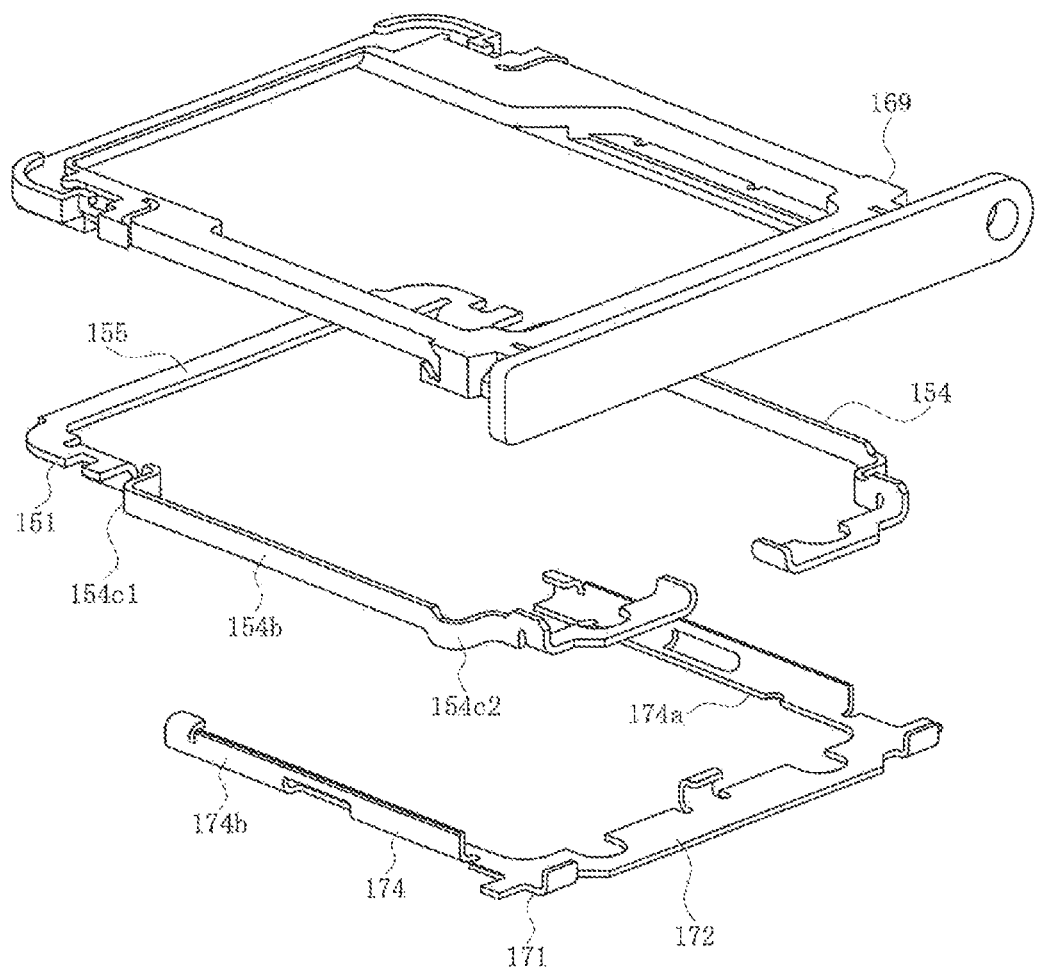
FIG. 6 is an exploded view of the card tray in an embodiment of the present disclosure.
Figure 7A:
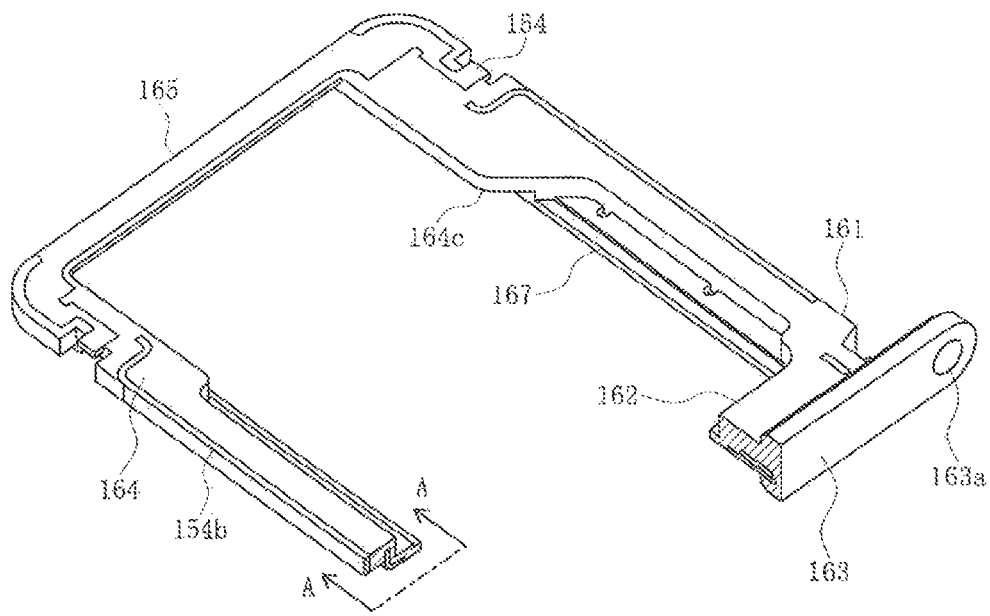
FIG. 7(a) is a perspective cutaway view of the entire card tray in an embodiment of the present disclosure.
Figure 7B:
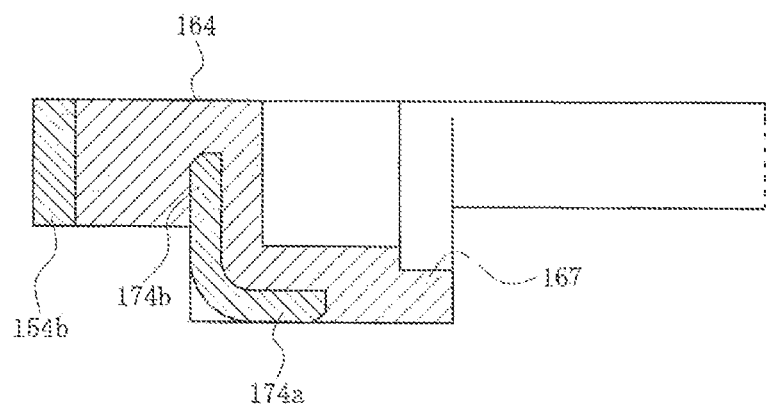
FIG. 7(b) is a cross-sectional view taken along line A-A of FIG. 7(a).
Figures 8A, 8B:
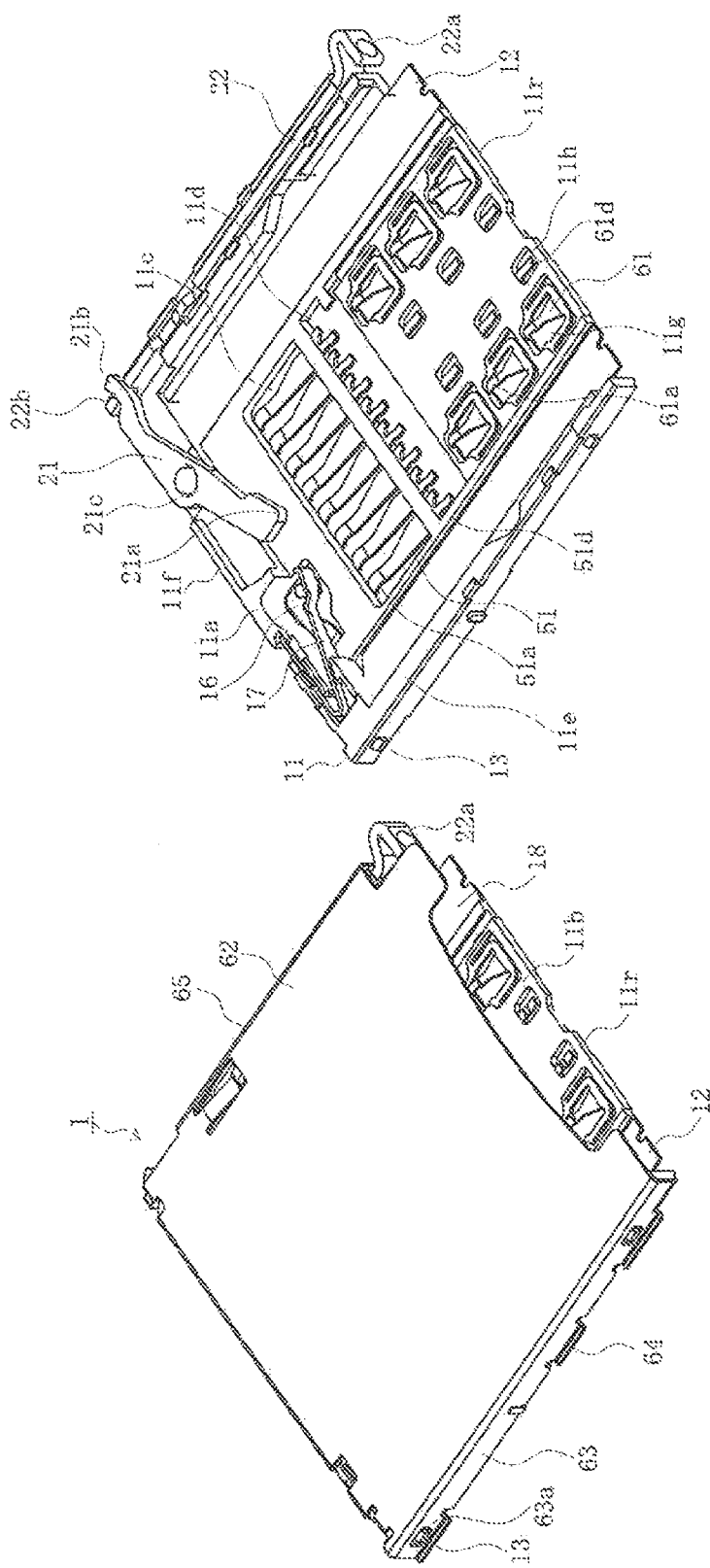
FIG. 8(a) is a perspective view of the card connector in an embodiment of the present disclosure, in which the shell is attached.
FIG. 8(b) is a perspective view of the card connector of FIG. 8(a) with the shell removed.
Figure 9:
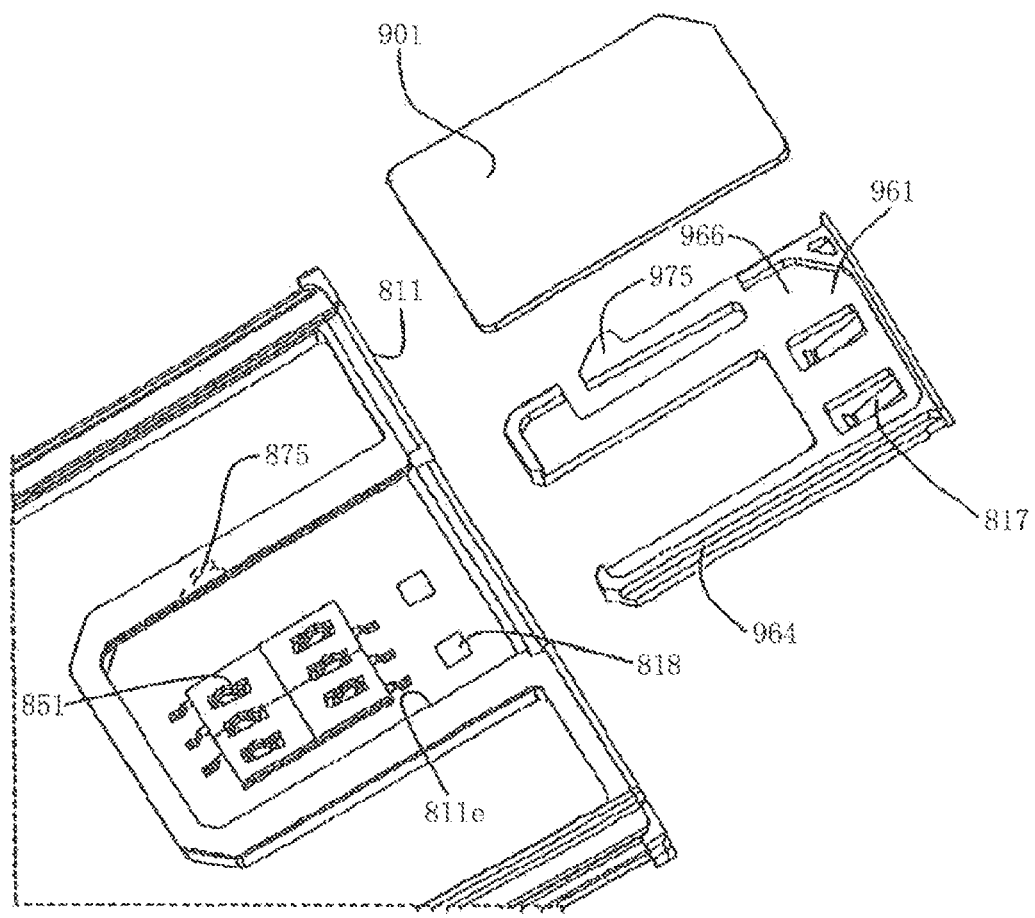
FIG. 9 is a perspective view of a card tray and a card connector of the prior art.

FIGS. 1(a) and 1(b) are a pair of perspective views of a card tray inserted into a card connector according to an embodiment of the present disclosure. FIG. 2 is a perspective view of the card tray according to an embodiment of the present disclosure. FIGS. 3(a), 3(b), 3(c), 3(d) and 3(e) are a set of five views of the card tray according to an embodiment of the present disclosure. FIG. 4 is a perspective view showing the first member and the second member of the metal portion of the card tray according to an embodiment of the present disclosure. FIG. 5 is a perspective view showing the combined first member and second member of the metal portion of the card tray according to an embodiment of the present disclosure. FIG. 6 is an exploded view of the card tray in an embodiment of the present disclosure. FIGS. 7(a) and 7(b) are a pair of cutaway views of the card tray in an embodiment of the present disclosure. FIGS. 8(a) and 8(b) are a pair of perspective views of the card connector in an embodiment of the present disclosure.

In the drawings, 160 is the card tray serving as the card holding member in the present embodiment. As shown in FIG. 1(a), it is inserted into a card connector 1 mounted in an electronic device (not shown) while housing a card 101. In other words, a card 101 is accommodated inside the card tray 160 with both side surfaces 112 surrounded by the frame portion 161 facing the side surfaces 112, and is mounted in an electronic device via a card connector 1. The electronic device may be any type of device, including a personal computer, a mobile phone, a smartphone, a communication modem, a tablet, a digital camera, a video camera, a music player, a gaming console, or a car navigation system.

However, when a card connector other than card connector 1 is mounted in an electronic device, the user sometimes does not use the card connector 1. In this case, the user can insert the empty card tray 160, that is, the card tray 160 not housing a card 101, into the card connector 1 for storage.

The card 101 can be any type of card such as a SIM card, microSIM card, nanoSIM card, MMC® (Multi Media) card, SD® (Secure Digital) card, miniSD® card, xD-Picture® card, Memory Stick®, Memory Stick Duo®, Smart Media®, or TransFlash® memory card. In the present embodiment, the card is a microSD® card.

In the present embodiment, as shown in FIG. 1(b), the card 101 has a substantially rectangular band-like shape, and electrode pads serving as the terminal members (not shown) are arranged in rows along the front end 111f on one surface (the lower surface in the example shown in the drawing). Electrode pads are not provided on the other surface, that is, on the upper surface 111b opposite the lower surface. A notched portion 111c is formed in one of the corners connecting the left and right ends of the front end 111f to the side ends 111s. More specifically, this recessed portion is formed in the front right corner of the upper surface 111b. The notched portion 111c is formed by cutting away one of the corners where the front end 111f of the card 101 is connected to a side end 111s so as to form a truncated triangle.

In the present embodiment, the expressions indicating direction, such as upper, lower, left, right, front and rear, which are used to explain the configuration and operation of each portion of the card connector 1, card tray 160, and card 101, are relative and not absolute. They depend on the orientation of the card connector 1, card tray 160, and card 101, and their constituent components shown in the drawings. When the orientation of the card connector 1, card tray 160, and card 101 or their constituent components changes, the interpretation changes in response to the change in orientation.

Here, the card tray 160 includes a first metal portion 151 and a second metal portion 171 integrally formed by stamping and bending a metal plate, and a resin portion 169 made of an insulating resin covering and becoming integrated with a portion of the first metal portion 151 and the second metal portion 171 using a molding technique such as insert molding or overmolding.

The frame portion 161 of the card tray 160 is a rectangular frame member surrounding all four sides of a space 166 serving as the card accommodating space for accommodating a card 101. The frame portion 161 has a rear frame portion 162 and a front frame portion 165 extending parallel to each other in the transverse direction, and a pair of side frame portions 164 extending in the longitudinal direction and connected to both ends of the rear frame portion 162 and the front frame portion 165.

A protruding portion 164c is formed in a corner, more specifically, the front right corner, where one of the side frame portions 164 is connected to the front frame portion 165. The protruding portion 164c functions as a card orientation restricting portion. As shown in the drawing, when the card 101 has the proper orientation, the card 101 is allowed to be housed inside the card tray 160. However, when the card 101 does not have the proper orientation, the card 101 is not allowed to be housed inside the card tray 160. In other words, the card 101 cannot be housed inside the space 166. More specifically, the protruding portion 164c has a truncated triangle profile and is formed in a way to correspond to the notched portion 111c of the card 101 housed inside the space 166 in the proper orientation. As a result, a card 101 cannot be inserted into and housed in the space 166 inside the card tray 160 when oriented improperly, that is, when inserted upside-down or backwards.

A rear panel portion 163 is connected to the rear of the rear frame portion 162. A through-hole 163a is formed at one end of the rear panel portion 163 and passes through the rear panel portion 163 in the thickness direction. The through-hole 163a allows an auxiliary member such as a pin or rod to be inserted in order to apply pressure and operate the operating portion 22a of the push rod 22 in the card connector 1.

The upper surfaces of the rear frame portion 162, the side frame portion 164, and the front frame portion 165, excluding the rear panel portion 163, are flush. However, the lower surface of the front frame portion 165 is preferably higher than the lower surface of the side frame portions 164. The lower surface of the front frame portion 165 is also preferably higher than the lower surface of a card 101 held inside the space 166. In this way, the front frame portion 165 does not make contact with the primary terminals 51 and secondary terminals 61 when the card tray 160 is inserted into the card connector 1.

Eaves portions 167 extend into the space 166 from the inner lower ends of the rear frame portion 162 and the left and right side frame portions 164. The eaves portions 167 function as card support portions for supporting at least some of the lower surface of the card 101 held inside the space 166, for example, near the side ends.

The side surfaces of the rear frame portion 162, the side frame portions 164 and the front frame portion 165 facing the space 166, that is, the inside surfaces, are all coated with an insulating resin so that the first metal portion 151 and the second metal portion 171 are not exposed. Therefore, even though the peripheral edges of the electrode pads arranged on the lower surface of the card 101 housed inside the space 166 are exposed on the side surfaces 112 of the card 101, they do not come into contact with the first metal portion 151 or the second metal portion 171.

As shown in FIG. 4, the first metal portion 151 is a frame member with a substantially rectangular profile in plan view, and includes a rear metal frame portion 152 and a front metal frame portion 155 extending in the transverse direction substantially parallel to each other, and a pair of metal side frame portions 154 extending on the longitudinal direction and connecting both ends of the rear metal frame portion 152 to both ends of the front metal frame portion 155. Most of the first metal portion 151 is a plate-like member running parallel to the upper surface and the lower surface of the rear frame portion 162, the side frame portions 164, and the front frame portion 165. However, the metal side frame portions 154 include side panel portions 154b in the middle to protect the outer surface of the side frame portions 164 from rubbing against the side wall portions 11e of the housing 11 when the card tray 160 is inserted into the card connector and ejected from the card connector 1. The side panel portions 154b are panel-like members extending in the thickness direction of the card tray 160 (in the vertical direction) in order to protect the outer surfaces of the side frame portions 164. As in the case of the rear metal frame portion 152 and the front metal frame portion 155, the rest of the metal side frame portions 154 are panel-like members extending parallel to the upper surface or the lower surface of the card tray 160. The longitudinal ends of the side panel portions 154b are connected to the rest of the metal side frame portions 154 via a front bent portion 154a1 and a rear bent portion 154a2. In the following explanation, the front bent portion 154a1 and the rear bent portion 154a2 are sometimes referred to collectively as the bent portions 154a.

The metal side frame portions 154 include front corner portions 154c1 connected to the front ends of the side panel portions 154b and rear corner portions 154c2 connected to the rear ends of the side panel portions 154b. The front corner portions 154c1 and the rear corner portions 154c2 are bent at a 90-degree angle. In the following explanation, they are sometimes referred to collectively as the corner portions 154c. The presence of the front corner portions 154c1 and the rear corner portions 154c2 expose only the side panel portions 154b to the outer surfaces of the side frame portions 164, and the rest of the metal side frame portions 154 are positioned to the outside of the side frame portions 164 and covered by the resin portion 169.

Because the metal side frame portions 154 have a complicated shape including side panel portions 154b, bent portions 154a, and corner portions 154c extending in the thickness direction of the card tray 160, the first metal portion 151 would be difficult to manufacture with a completely closed rectangular shape in plan view by stamping and bending a metal sheet. A first metal portion 151 with a completely closed rectangular shape in plan view can be obtained if several manufacturing steps were employed and considerable personnel time expended, but the resulting component would be expensive. Therefore, the first metal portion 151 in the present embodiment does not have a closed rectangular shape in plan view but includes cutaway portions on the sides of the rectangle. As a result, the rear metal frame portion 152 includes a cutaway portion 152a in the middle which separates the frame portion into left and right sections. Also, each of the left and right rear metal frame portions 152 include a recessed portion 152b used in the positioning process.

As shown in FIG. 4, the second metal portion 171 is a frame member having a squared-off C-shaped profile in plan view, and includes a continuous band-shaped rear metal frame portion 172 extending in the transverse direction, and a pair of metal side frame portions 174 extending forward from both ends of the rear metal frame portion 172. A pair of recessed portions 172b is formed in the rear metal frame portion 172 for use in the positioning process. Most of the second metal portion 171 is a plate-like member running parallel to the upper surface and the lower surface of the rear frame portion 162, the side frame portions 164, and the front frame portion 165. However, the metal side frame portions 174, in addition to a bottom panel portion 174a flush with most of the second metal portion 171, includes side wall portions 174b running substantially parallel to the side panel portions 154b extending in the thickness direction of the card tray 160. The side wall portions 174b are connected to the side edges of the bottom panel portion 174a via a portion bent at a 90-degree angle. Therefore, as shown in FIG. 7(b), the second metal portion 171 has a substantially L-shaped cross-sectional profile.

As shown in FIG. 5, the first metal portion 151 and the second metal portion 171 overlap and are covered at least on the periphery by the resin portion 169. In this case, the cutaway portion 152a in the rear metal frame portion 152 of the first metal portion 151 is blocked by the rear metal frame portion 172 of the second metal portion 171. Also, in plan view, the recessed portion 152b of the rear metal frame portion 152 and the recessed portion 172b of the rear metal frame portion 172 are aligned. Therefore, because the first metal portion 151 and the second metal portion 171 overlap and are fixed in place by the resin portion 169 to form a profile in plan view which is a completely closed rectangle, the structure is strong. As a result, the strength of the frame portion 161 of the card tray 160 is enhanced. Because the recessed portion 152b of the rear metal frame portion 152 and the recessed portion 172b of the rear metal frame portion 172 are filled with resin from the resin portion 169, the recessed portions function as anchors, and the relative positional relationship between the rear metal frame portion 152 and the rear metal frame portion 172 is reliably maintained.

The first metal portion 151 and the second metal portion 171 may be made of the same type of metal and have the same thickness. However, the first metal portion 151 is preferably thicker than the second metal portion 171. For example, the thickness of the first metal portion 151 may be 0.2 mm, and the thickness of the second metal portion 171 may be 0.15 mm. A portion of the thicker first metal portion 151 is preferably exposed to the frame portion 161 of the card tray 160 where strength and durability are required.

In the example shown in the drawings, the front edge of the front metal frame portion 155 is exposed to the front surface of the front frame portion 165. Because the front surface of the front frame portion 165 comes into contact with the force output portion 21a of the ejection lever 21 of the card connector 1 and is subjected to force from the force output portion 21a in the direction of ejection, it requires strength and durability. The side panel portions 154b of the metal side frame portions 154 are also exposed to the outer surface of the side frame portions 164. Because the outer surfaces of the side frame portions 164 rub against the inner surfaces of the side wall portions 11e of the card connector 1, they require strength and durability. As mentioned above and as shown in FIG. 7(a) and FIG. 7(b), both the first metal portion 151 and the second metal portion 171 are not exposed on the surfaces facing the space 166 housing the card 101.

In the present embodiment, as shown in FIG. 8(a), the card connector 1 has a housing 11 integrally molded from an insulating material such as a synthetic resin, and a shell 65 or cover member formed integrally by punching and bending a conductive metal sheet which is attached to the upper side of the housing 11. The shell 65 has a substantially rectangular ceiling panel portion 62 and side panel portions 63 erected on the side edges of the ceiling panel portion 62, and covers the housing 11 and at least some of the upper portion of the card tray 160 inserted into the housing 11 and the card connector 1. The card connector 1 has a substantially parallelepiped shape, and is mounted on the surface of a board such as a printed circuit board in the electronic device. A card tray 160 is inserted into the insertion slot 18 in the rear (below right in FIG. 8(a)). More specifically, the card tray 160 is inserted into the card insertion space between the housing 11 and the shell 65.

The housing 11 includes primary terminals 51, secondary terminals 61, and a lower shell 12 integrally formed by stamping and bending a metal plate. This substantially plate-like member is integrally molded using a molding technique such as insert molding or overmolding with an insulating resin which covers and becomes integrated with at least a portion of the primary terminals 51, secondary terminals 61, and lower shell 12. The lower shell 12 is a frame member for reinforcing the housing 11, and is preferably formed from the same material as the primary terminals 51 and/or secondary terminals 61, but is electrically insulated from the primary terminals 51 and the secondary terminals 61.

The housing 11 also includes a bottom wall portion 11b serving as the substantially rectangular, plate-like terminal holding portion, an inner wall portion 11a thicker than the bottom wall portion 11b which extends in the transverse direction of the housing 11 along the front end portion 11f in the insertion direction (longitudinal direction) of the card tray 160, and a pair of side wall portions 11e thicker than the bottom wall portion 11b extending in the insertion direction of the housing 11 along both side edges. The lower surfaces of the inner wall portion 11a and the side wall portions 11e are flush with the lower surface of the bottom wall portion 11b, and the upper surfaces are above the upper surface of the bottom wall portion 11b. The end portion of the housing 11 in the insertion direction of the card tray 160 is referred to as the rear end portion 11r.

Here, the bottom wall portion 11b includes a primary terminal holding recessed portion 11c and secondary terminal holding recessed portions 11g for holding the exposed portions of the primary terminals 51 and the secondary terminals 61, as well as a primary terminal solder tail opening 11d and secondary terminal solder tail openings 11h. The primary terminal holding recessed portion 11c, secondary terminal holding recessed portions 11g, primary terminal solder tail opening 11d, and secondary terminal solder tail openings 11h are openings which pass through the bottom wall portion 11b in the thickness direction.

There is a single primary terminal holding recessed portion 11c and primary terminal solder tail opening 11d, and a single row of primary terminals 51 extending in the transverse direction of the housing 11 is arranged inside. At least a portion of the primary terminals 51 is embedded in the bottom wall portion 11b, and at least the contact portion 51a is exposed inside the primary terminal holding recessed portion 11c. The solder tail portion 51d of each terminal to be soldered is also exposed inside the primary terminal solder tail opening 11d. The contact portion 51a of each primary terminal 51 is biased upwards by the spring action of the arm portion, and comes into contact with the corresponding electrode pad on the card 101 inside the card tray 160 held inside the card connector 1. Each solder tail portion 51d is connected electrically by solder to a signal line, contact pad, or terminal formed on a printed circuit board.

The secondary terminal holding recessed portions 11g and the secondary terminal solder tail openings 11h are arranged side by side to form rows extending in the longitudinal direction of the housing 11. In the example shown in the drawing, there is two rows of three. At least a portion of each secondary terminal 61 is embedded in the bottom wall portion 11b, and at least a contact portion 61a is exposed inside each secondary terminal holding recessed portion 11g. A solder tail portion 61d to be soldered is exposed in each secondary terminal solder tail opening 11h. Therefore, the secondary terminals 61 held in each secondary terminal holding recessed portion 11g are arranged in two rows extending in the longitudinal direction of the housing 11. At least a portion of each secondary terminal 61 is embedded in the bottom wall portion 11b, and at least the contact portion 61a is exposed inside a second terminal holding recessed portion 11g. The contact portion 61a of each secondary terminal 61 is biased upwards by the spring action of the arm portion, and comes into contact with the corresponding electrode pad on the card 101 inside the card tray 160 held inside the card connector 1. Each solder tail portion 61d is connected electrically by solder to a signal line, contact pad, or terminal formed on a printed circuit board.

The primary terminals 51 are arranged so as to match the electrode pads on a microSD® card, and the secondary terminals 61 are arranged so as to match the electrode pads on a nanoSIM® card. In other words, the card connector 1 can accommodate different types of cards housed in the card tray 160. For example, it can accommodate a card 101 that is a microSD® card or a nanoSIM® card. The number and arrangement of primary terminals 51 and secondary terminals 61 can be changed if necessary to conform to the number and arrangement of electrode pads on a card 101. When the card tray 160 can only accommodate a single type of card 101, either the primary terminals 51 or the secondary terminals 61 can be omitted.

The lower shell 12 is exposed between the bottom wall portion 11b and the left and right side wall portions 11e. A push rod 22 is slidably mounted in the longitudinal direction on the inside surface of one of the side wall portions 11e. This serves as the tray ejection operation member in the tray ejection mechanism for ejecting the card tray 160 inserted into the card connector 1. The push rod 22 is a linear rod-shaped or band-shaped member, and a bent operating portion 22a is integrally connected to the rear end portion.

An engaging portion 22b is formed in the front end portion of the push rod 22 to engage the force input portion 21b of the ejection lever 21. The ejection lever 21 is a lever-shaped member arranged near the inner wall portion 11a, and functions as the tray ejection lever of the tray ejection mechanism. As a result, the ejection lever 21 is pivotally mounted on the bottom wall portion 11b at the fulcrum portion 21c. The end on the other side of the fulcrum portion 21c from the force input portion 21b functions as the force output portion 21a which comes into contact with the front frame portion 165 of the card tray 160 inserted into the card connector 1 and applies force to the card tray 160 in the direction of ejection.

The shell 65 has side panel portions 63 extending from the side edges of a ceiling panel portion 62. A plurality of locking openings 63a are formed on the side panel portions 63. When the shell 65 is mounted on the upper side of the housing 11, the locking openings 63a are engaged by locking protrusions 13 formed on the outside surfaces of the side wall portions 11e of the housing 11, and the shell 65 is secured on the housing 11. Also, solder tail portions 64 are formed at any location on the lower end of the side panel portions 63. These serve as board-connectors and stand erect from the side panel portions 63 and extend outward in the transverse direction of the shell 65. The solder tail portions 64 are secured by soldering to anchoring pads formed on the surface of the board.

The housing 11 includes a movable member 17 and a fixed member 16 for a detection switch used to detect whether a card tray 160 inserted into the card connector 1 has reached a predetermined position inside the card connector 1 (the position at which the inserted card tray 160 is locked). When the card tray 160 has not reached the predetermined position, the movable member 17 and the fixed member 16 are separate, and the detection switch is not electrified or turned OFF. However, when the card tray 160 reaches the predetermined position, the movable member 17 presses against the front frame portion 165 of the card tray 160, and the movable member 17 is displaced and comes into contact with the fixed member 16. Because this electrifies or turns the detection switch ON, it is determined that the card tray 160 has reached the predetermined position.

The following is an explanation of the operations performed by a card connector 1 with the configuration described above. First, the operations performed to insert the card tray 160 will be explained.

The user manually inserts a card tray 160 housing a card 101 into the insertion slot 18 in the rear of the card connector 1. Here, the card tray 160 is inserted properly with the upper surface facing upwards towards the ceiling panel portion 62 of the shell 65, the lower surface facing downwards towards the bottom wall portion 11b of the housing 11, and the front frame portion 165 facing the front end portion 11f of the housing 11. As a result, the upper surface 111b of the card 101 housed inside the space 166 which does not include any electrode pads faces upwards, and the lower surface including electrode pads and exposed on the lower surface of the card tray 160 is facing downwards. The card tray 160 can be inserted into the card connector 1 and ejected from the card connector 1 whether the tray is housing a card 101 or not housing a card 101. In the following explanation, the tray is housing a card 101. As mentioned above, the card 101 is a microSD® card.

When the card tray 160 is inserted from the insertion slot 18 into the card insertion space formed between the housing 11 and the shell 65, the card tray 160 advances into the card insertion space with the lower surfaces of the side frame portions 164 approaching or making contact with the upper surface of the lower shell 12 and the outer surfaces of the side frame portions 164 sliding along and being guided by the inner surfaces of the side wall portions 11e of the card connector 1. Because the outer surfaces of the side frame portions 164 are exposed by the side panel portions 154b of the metal side frame portions 154, they do not become worn or damaged even when sliding against the inner surfaces of the side wall portions 11e.

Next, when the user pushes in the card tray 160, as shown in FIG. 1(a), the card tray 160 reaches the predetermined position inside the card connector 1. At this time, the movable portion 17 is pushed by the front frame portion 165 and comes into contact with the fixed member 16, turning the detection switch ON to indicate that the card tray 160 has reached the predetermined position inside the card tray 1.

As the card tray 160 advances to the predetermined position inside the card connector 1, the force output portion 21a of the ejection lever 21 is pushed by the front frame portion 165 and displaced further in the direction of the front end portion 11f, and the push rod 22 slides to the position protruding farthest to the rear.

When the card tray 160 reaches the predetermined position inside the card connector 1, the force output portion 21a of the ejection lever 21 is interfered with by the inner wall portion 11a of the housing 11 and cannot be displaced any further in the direction of the front end portion 11f. As a result, the card tray 160 cannot advance any further.

Locking members may be provided on the card tray 160 and the card connector 1 which engage and disengage from each other so that, when the card tray 160 reaches the predetermined position, the card tray 160 can be locked at the predetermined position to prevent displacement to the rear from the predetermined position.

The card 101 housed inside the card tray 160 can exchange data along with the card tray 160 at the predetermined position using an arithmetic processing means in the electronic device mounted in the card connector 1. When the card 101 is held in the predetermined position, the contact portions 51a of the primary terminals 51 make contact with the electrode pads on the card 101 and establish an electrical connection.

The following is an explanation of the operations performed to eject a card tray 160 from the card connector 1.

First, the user manually inserts an auxiliary member such as a pin or rod into the through-hole 163a formed in the rear panel portion 163 from the rear of the card tray 160, and the tip of the auxiliary member is brought into contact with the operating portion 22a of the push rod 22. When the user pushes in the push rod 22 via the auxiliary member, the force input portion 21b of the ejection lever 21 engaging the engaging portion 22b of the push rod 22 is displaced forward. As a result, the front frame portion 165 is pressed against the force output portion 21a of the ejection lever 21, the card tray 160 moves to the rear from the predetermined position, the detection switch turns OFF, and movement of the card tray 160 to the rear of the predetermined position is detected. Because the front edge of the front metal frame portion 155 is exposed on the front surface of the front frame portion 165, the front frame portion 165 is not damaged even when the force sustained from the force output portion 21*a* of the ejection lever 21 is strong.

In this way, the rear panel portion 163 of the card tray 160 protrudes sufficiently from the insertion slot 18 of the card connector 1. This allows the user to grasp the rear panel portion 163 and remove the card tray 160 from the card connector 1.

In the present embodiment, the card tray 160 was able to hold a card 101 including electrode pads and was able to be inserted into a card connector 1. The card tray 160 included a frame portion 161 opposing the side surfaces 112 of the card 101. The frame portion 161 included a first metal portion 151 composed of a metal plate, a second metal portion 171 composed of a metal plate being a separate component from the first metal portion 151, and a resin portion 169 surrounding and covering at least a portion of the first metal portion 151 and the second metal portion 171.

Because the frame portion 161 includes a first metal portion 151 and a second metal portion 171, it is stronger and the card tray 160 does not experience wear or damage. Because the first metal portion 151 and the second metal portion 171 are covered by the resin portion 169, the card 101 does not experience short-circuiting. As a result, greater reliability is obtained.

Also, the first metal portion 151 is a frame portion including a cutaway portion 152*a*, and the second metal portion 171 forms a closed rectangular portion including a portion corresponding to at least the cutaway portion 152*a*, with the cutaway portion 152*a* being blocked by the second metal portion 171 in plan view. Because the first metal portion 151 and the second metal portion 171 are separate members, they can be easily formed from metal plates. Because the first metal portion 151 and the second metal portion 171 form a closed rectangular portion, the frame portion 161 including the first metal portion 151 and the second metal portion 171 has enhanced strength.

In addition, the frame portion 161 includes a space 166 for accommodating the card 101, and the first metal portion 151 and the second metal portion 171 are not exposed on the inner surface of the space 166. As a result, even though the edges of the electrode pads on the lower surface of the card 101 housed inside the space 166 are exposed on the side surfaces 112 of the card 101, they do not make contact with the first metal portion 151 or the second metal portion 171 at any location and short-circuiting does not occur.

The first metal portion 151 is a metal plate that is thicker than the second metal portion 171. Because the second metal portion 171 which does not require much strength is thin, the thickness of the frame portion 161 can be reduced. As a result, a thinner card tray 160 can be obtained.

In addition, the frame portion 161 includes a front frame portion 165 positioned in front when the card tray 160 is inserted into the card connector 1, and side frame portions 164 connected to both ends of the front frame portion 165, and a portion of the first metal portion 151 is exposed on the front surface of the front frame portion 165 and the outer surfaces of the side frame portions 164. As a result, the front surface of the front frame portion 165 and the outer surfaces of the side frame portions 164, which require strength and durability in the frame portion 161, can be given greater strength and durability.

The present disclosure is not limited to the embodiments described above. Variations based on the spirit of the disclosure are possible, and these do not depart from the scope of the present disclosure.

The present disclosure can be applied to a card holding member and to a card connector.

The invention claimed is:

1. A card holding member which is configured to hold a card having terminal members and which is configured to be inserted into a card connector, the card holding member comprising:
    a frame portion including a first metal portion, a second metal portion and a resin portion, the first metal portion composed of a metal plate, the second metal portion composed of a metal plate, the second metal portion being a separate component from the first metal portion, the first and second metal portions and the resin portion being molded together, whereby the resin portion secures the first and second metal portions in place relative to each other.

2. A card connector able to receive the card holding member according to claim 1, the card connector including an ejection mechanism for ejecting the card holding member therefrom.

3. A card holding member according to claim 1, wherein the frame portion includes a front frame portion and side frame portions connected to both ends of the front frame portion, and wherein a portion of the first metal portion is exposed on a front surface of the front frame portion and on outer surfaces of the side frame portions.

4. A card connector able to receive the card holding member according to claim 3, the card connector including an ejection mechanism for ejecting the card holding member therefrom.

5. The card holding member according to claim 1, wherein each of the first and second metal portions have a uniform thickness, and wherein the uniform thickness of the first metal portion is greater than the uniform thickness of the second metal portion.

6. The card holding member according to claim 5, wherein the frame portion includes a front frame portion and side frame portions connected to both ends of the front frame portion, and wherein a portion of the first metal portion is exposed on a front surface of the front frame portion and on outer surfaces of the side frame portions.

7. A card connector able to receive the card holding member according to claim 5, the card connector including an ejection mechanism for ejecting the card holding member therefrom.

8. The card holding member according to claim 1, wherein the frame portion defines a card accommodating space for accommodating the card, and wherein only the resin portion of the frame is exposed to the card accommodating space.

9. The card holding member according to claim 8, wherein each of the first and second metal portions have a uniform thickness, and wherein the uniform thickness of the first metal portion is greater than the uniform thickness of the second metal portion.

10. The card holding member according to claim 9, wherein the frame portion includes a front frame portion and side frame portions connected to both ends of the front frame portion, and wherein a portion of the first metal portion is exposed on a front surface of the front frame portion and on outer surfaces of the side frame portions.

11. A card connector able to receive the card holding member according to claim 10, the card connector including an ejection mechanism for ejecting the card holding member therefrom.

12. The card holding member according to claim 1, wherein the first metal portion includes a cutaway portion, and wherein the second metal portion overlaps at least a portion of the first metal portion and blocks the cutaway portion.

13. The card holding member according to claim 12, wherein the frame portion defines a card accommodating space for accommodating the card, and wherein only the resin portion of the frame is exposed to the card accommodating space.

14. The card holding member according to claim 13, wherein each of the first and second metal portions have a uniform thickness, and wherein the uniform thickness of the first metal portion is greater than the uniform thickness of the second metal portion.

15. The card holding member according to claim 14, wherein the frame portion includes a front frame portion and side frame portions connected to both ends of the front frame portion, and wherein a portion of the first metal portion is exposed on a front surface of the front frame portion and on outer surfaces of the side frame portions.

16. A card connector able to receive the card holding member according to claim 15, the card connector including an ejection mechanism for ejecting the card holding member therefrom.

17. A combination comprising:
a card connector having an ejection mechanism; and
a card holding member, the card holding member being configured to hold a card having terminal members and being configured to be inserted into the card connector, the card holding member having a frame portion including first and second metal portions and a resin portion, the first metal portion composed of a metal plate, the second metal portion composed of a metal plate, the second metal portion being a separate component from the first metal portion, the resin portion surrounding and covering at least a portion of the first and second metal portions,
wherein the ejection mechanism is configured to eject the card holding member from the card connector after the card holding member is inserted into the card connector.

18. A card holding member which is configured to hold a card having terminal members and which is configured to be inserted into a card connector, the card holding member comprising:
a frame portion including a first metal portion, a second metal portion and a resin portion, the first metal portion composed of a metal plate, the second metal portion composed of a metal plate, the second metal portion being a separate component from the first metal portion, the resin portion surrounding and covering at least a portion of the first and second metal portions, the first metal portion including a cutaway portion, the second metal portion overlapping at least a portion of the first metal portion and blocking the cutaway portion.

* * * * *